United States Patent [19]

Takahashi et al.

[11] Patent Number: 5,390,305
[45] Date of Patent: Feb. 14, 1995

[54] INFORMATION PROCESSING APPARATUS CAPABLE OF EXECUTING EXCEPTION AT HIGH SPEED

[75] Inventors: Masafumi Takahashi; Yasuo Yamada, both of Tokyo, Japan

[73] Assignee: Kabushiki Kaisha Toshiba, Kawasaki, Japan

[21] Appl. No.: 857,419

[22] Filed: Mar. 26, 1992

[30] Foreign Application Priority Data

Mar. 29, 1991 [JP] Japan .................................. 3-067266

[51] Int. Cl.$^6$ .............................................. G06F 9/46
[52] U.S. Cl. ............................... 395/375; 364/DIG. 1; 364/230; 364/230.1; 364/230.2
[58] Field of Search ................... 364/DIG. 1 MS File, 364/DIG. 2 MS File; 395/345, 500, 800

[56] References Cited

U.S. PATENT DOCUMENTS 4,956,767  9/1990  Stephenson ..................... 395/500
5,193,187  3/1993  Strout, II et al. ................ 395/650

FOREIGN PATENT DOCUMENTS 2-176832  7/1990  Japan .

Primary Examiner—Robert B. Harrell
Attorney, Agent, or Firm—Foley & Lardner

[57] ABSTRACT

In a microprocessor, an exception instruction such as an interrupt demand is executable at high speed. The microprocessor comprises a normal-instruction executing unit for controlling execution of a normal instruction used for the information processing apparatus; an exception executing unit independently operable from the normal instruction executing unit, for controlling a transition process operation to an exception used in the information processing apparatus; and, an exception initiating unit for initiating the transition process operation of the exception unit by immediately recognizing an issuance of an exception demand, whereby upon issuance of the exception demand, the transition process operation to the exception is independently executable by the exception executing unit while the normal instruction is executed by the normal-instruction execution unit.

12 Claims, 10 Drawing Sheets

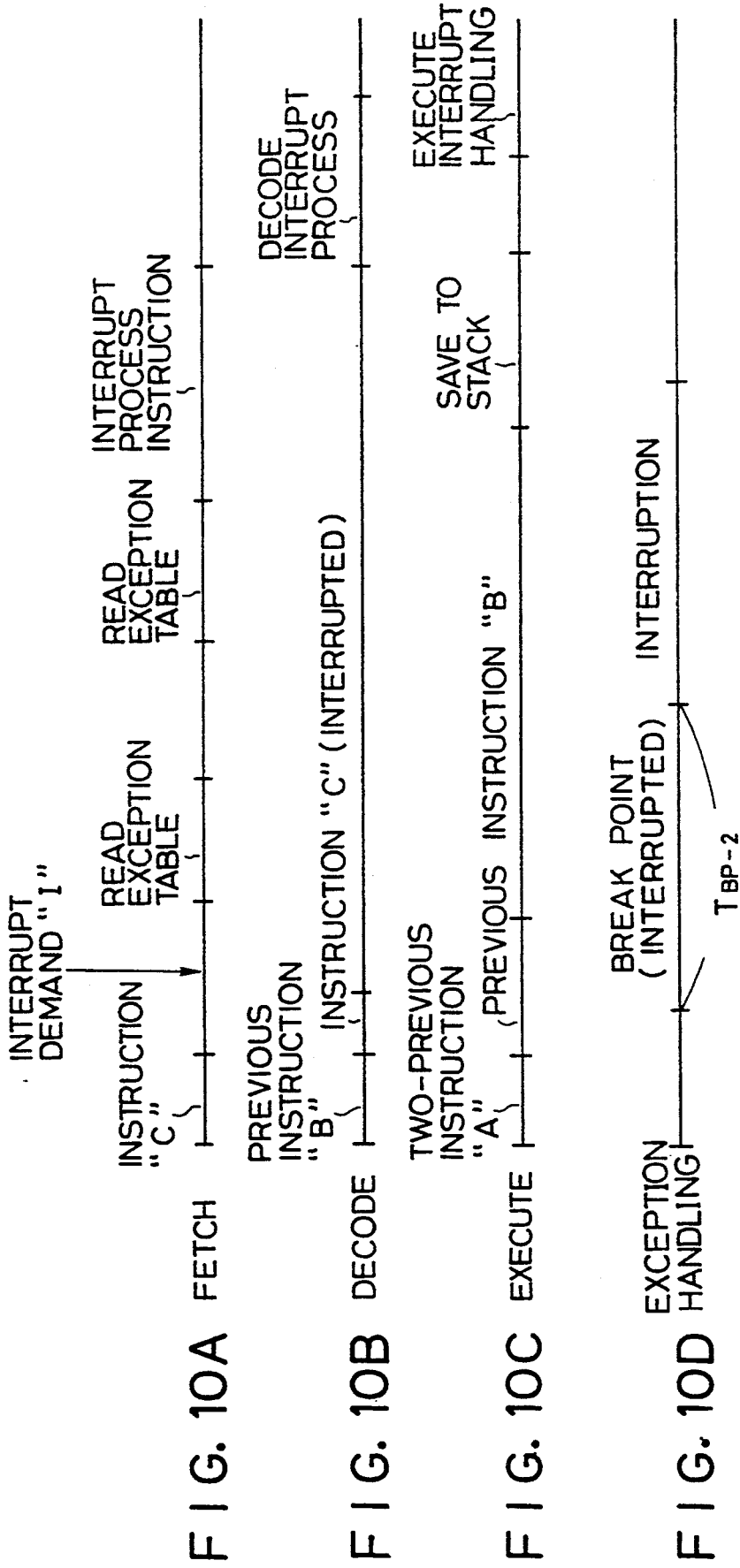

INFORMATION PROCESSING APPARATUS CAPABLE OF EXECUTING EXCEPTION AT HIGH SPEED

BACKGROUND OF THE INVENTION

1. Field of the Invention

The present invention generally relates to an information processing apparatus capable of executing at high speed an exception demanded while performing normal instructions of a computer program. More specifically, the present invention is directed to such an information processing apparatus that the exception is executed by an exception sequencer independently provided within the information processing apparatus with respects to the normal process sequencer.

2. Description of the Prior Art

In accordance with great progress in recent LSI techniques, many types of microprocessors with high performance (namely, information processing apparatuses) have been developed in which high processing capabilities are integrated within a single semiconductor chip. A typical information processing apparatus is so arranged as shown in FIG. 1. This conventional information processing apparatus is mainly constructed of an execution control unit 510, a data path 520, a memory control unit 530 and an instruction queue 540. In the information processing apparatus shown in FIG. 1, the execution control unit 510 corresponds to a sequencer for receiving an instruction from the instruction queue 540 to decode this instruction and therefore for performing an instructed calculation by controlling the data path 520. The execution control unit 510 is constructed of either a microprogram, or PLA and the like. Furthermore, when an instruction requiring a memory access is executed, the execution control unit 510 performs a handshake operation to access memories (not shown) via a memory data bus 20 and a memory address bus 40 under control of the memory control unit 530. The execution control unit 510 investigates whether or not any exception demand such as interrupt request at a time instant when the execution of the normal instructions is accomplished, and performs a transition process required to execute the exception (namely, transition to exception) if the exception demand is issued.

FIG. 2 is a timing chart for explaining the process operations of the normal instructions and also the exception demand, which are executed in the microprocessor shown in FIG. 1. As seen from this timing chart, both an instruction fetch operation to fetch the instruction from the memory (not shown) so as to store this instruction into the instruction queue 540, and an instruction execution operation are performed in an overlap condition. It is now assumed that an interrupt demand (i.e., exception demand) is issued while executing an instruction "B". Since the execution control unit 510 may recognize the issuance of this exception demand (or, the interrupt demand) at the end of accomplishing the instruction, recognition by the execution control unit 510 can be made after the above instruction "B" has been performed. Upon recognition of issuance of the interrupt demand, the execution control unit 510 of this microprocessor shown in FIG. 1 performs the transition operation to the exception.

The transition operation to the exception implies the following process operation. That is, the transition operation includes outputting of an interrupt acceptance signal to an external device; acquiring of an interrupt vector from an external device; calculating of an exception table address from an interrupt vector; accessing of an exception table; acquiring of a head address of an exception routine; starting to fetch an exception routine; and furthermore saving to a program counter and other types of registers. When these process operations are accomplished, if an instruction of the exception routine is fetched, the above-described exception is commenced. It should be noted that the instruction "X" and the instruction "Y", as shown in FIG. 2, correspond to an instruction series of the exception routine.

On the other hand, it is known from the conventional information processing apparatus that the sequencer for processing the normal instructions is commonly employed with the sequencer for processing the exception instruction within the execution control unit 510. As a result, the conventional information processing apparatus must execute the transition process for the exception and also other processes such as fetching of the exception routine, and furthermore must accomplish execution of the normal instruction under execution when the interrupt demand is issued until the exception is actually commenced since such an interrupt demand has been made.

As previously described, since a large number of process operations must be executed up to the transition for the exception upon issuance of the interrupt demand, it is practically very difficult to realize a high-speed interrupt response in the conventional information processing apparatus. In particular, if an instruction requiring a lengthy execution time period such as a dividing calculation demand is under execution in the conventional information processing apparatus upon issuance of the instruction demand, a lengthy preparing time period is necessarily needed so as to perform this interrupt demand.

SUMMARY OF THE INVENTION

The present invention has been made in an attempt to solve the above-described problems, and therefore has an object to provide an information processing apparatus capable of performing transition to an exception at high speed even when a normal instruction is being executed upon issuance of an interrupt demand (exception), without giving no adverse influence to the normal instruction processing sequence.

To achieve the above-described object, an information processing apparatus, according to the present invention, comprises normal-instruction executing means for controlling execution of a normal instruction used for the information processing apparatus;

exception executing means independently operable from the normal instruction executing means, for controlling a transition process operation to an exception used in the information processing apparatus; and, exception initiating means for initiating the transition process operation of the exception means (112) by immediately recognizing an issuance of an exception demand, whereby upon issuance of the exception demand, the transition process operation to the exception is independently executable by the exception executing means, while the normal instruction is executed by the normal-instruction execution means.

An information processing apparatus, according to one aspect of the present invention, comprises:

normal-instruction executing means for controlling execution of a normal instruction used for the information processing apparatus;

exception executing means independently operable from the normal-instruction executing means, for executing a first transition process operation to a first exception by comparing priority degrees between the first transition process operation and a second transition process operation to a second exception at a predetermined time instant when the first transition process operation is being executed in such a manner that if the priority degree of the second transition process operation is higher than that of the first transition process operation, the first transition process operation under execution is interrupted and also the second transition process operation is now executed; and, exception initiating means for initiating the first transition process operation by the exception means by immediately recognizing an issuance of an exception demand, whereby upon issuance of the exception demand, both the first and second transition process operations are independently executed by the exception executing means, while the normal instruction is executed by the normal-instruction execution means.

Furthermore, according to another aspect of the present invention, a microprocessor comprising:

an instruction executing unit for executing a normal instruction and an exception instruction used in the microprocessor;

a storage unit for previously storing at least said normal instruction and said exception instruction;

a instruction decoding unit having at least a normal-instruction decoding sequencer and an exception-instruction decoding sequencer, for decoding said normal instruction by said normal-instruction decoding sequencer and for independently decoding said exception instruction by said exception-instruction decoding sequencer with respect to the decoding operation by said normal-instruction decoding sequencer, whereby said instruction executing unit executes a transition process to said exception instruction while executing said normal instruction immediately upon receipt of an exception demand.

BRIEF DESCRIPTION OF THE DRAWINGS

For a better understanding of the present invention, reference is made to the following descriptions in conjunction with the accompanying drawings, in which:

FIGS. 10A, 10B, 10C and 10D are timing charts of various circuit blocks of the second processor when the break-point exception instruction is executed.

DETAILED DESCRIPTION OF THE PREFERRED EMBODIMENTS

Overall Arrangement of First Information Processing Apparatus

Figure 3:
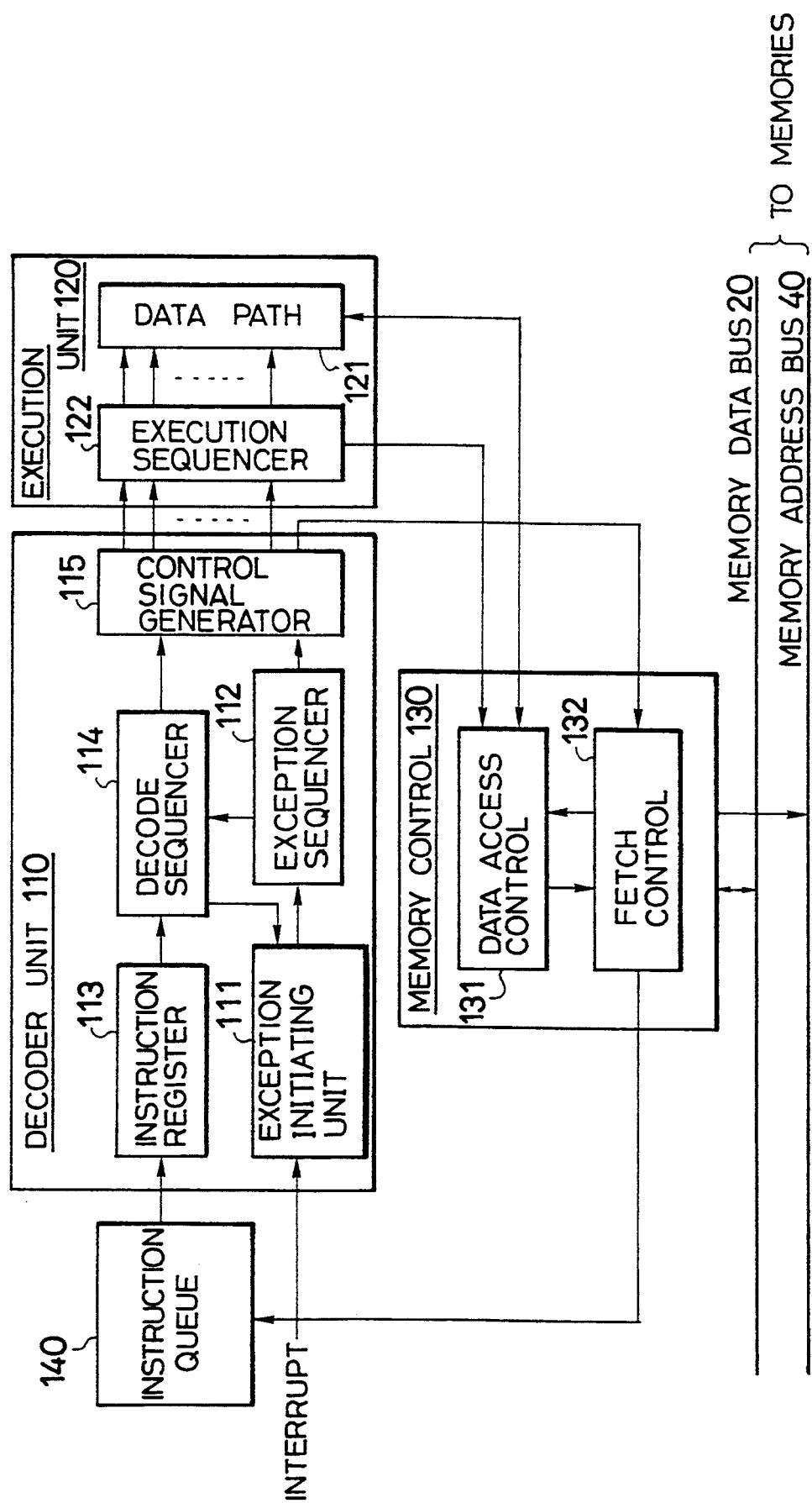
FIG. 3 is a schematic block diagram for showing an overall arrangement of an information processing apparatus according to a first preferred embodiment of the present invention.

Referring now to FIG. 3, an overall arrangement of an information processing apparatus according to a first preferred embodiment of the present invention will be described.

The first information processing apparatus is mainly constructed of a decoder unit 110, an execution unit 120, a memory control unit 130, and an instruction queue 140. Precisely speaking, the decoder unit 110 includes an exception initiating unit 111, an exception sequencer 112, an instruction register 113, a decode sequencer 114, and also a control signal generating unit 115. The execution unit 120 includes a data path 121 and an execution sequencer 122. Then, the memory control unit 130 includes a data access controlling unit 131 and a fetch controlling unit 132.

Although not shown in FIG. 3, memories are similarly employed and communicated via the memory data bus 20 and the memory address bus 40 to the relevant circuits of the first information processing apparatus under control of the memory control unit 130.

Functions of Various Circuits

Both the exception sequencer 112 and the decode sequencer 114 employed within the decoder 110 correspond to a sequencer for mainly controlling the transition process. The control signal generating unit 115 generates a predetermined control signal under a certain condition. Both the exception initiating unit 111 and the exception sequencer 112 mainly perform the exception such as the interrupt process, whereas both the instruction register 113 and the decode sequencer 114 perform the normal instruction decoding operation.

The exception initiating unit 111 recognizes an issuance of an exception demand, stores an exception number indicative of a sort of this exception, and then outputs this exception number to the exception sequencer 112 and the control signal generating unit 115. In case that a plurality of exception instructions are issued at the same time, one exception instruction having the top priority is acceptable by this exception initiating unit 111. It should be noted that such an exception instruction (demand) is issued inside this first information processing apparatus (processor), or outside this first processor. For instance, as the exception demand requested outside the processor, there are a general interrupt demand and a non-maskable interrupt demand. Also, as the exception demand requested inside the processor, there are a software interrupt demand (TRAP), a trace exception demand, a break point exception demand, and a zero-divide-calculation exception demand.

The exception sequencer 112 is to control the process operations executed in the decoder unit 110 among the transition process to the exception performed by the decoder unit 110 and the execution unit 120. The exception sequencer 112 is initiated at the same time when the exception demand is accepted by the exception initiating unit 111, and then outputs the condition number.

The instruction register 113 is such a register for storing therein the normal machine-language instructions fetched from the instruction queue 140. When the decode sequencer 114 is under initial condition, the instruction is acquired from the instruction queue 140 and thereafter stored in the instruction queue 140. Either immediate data, or a jumping destination address present in the instruction code of the instruction register 113 is transferred into a literal buffer (not shown in detail) employed within the data path 121 and also a fetch counter (not shown in detail) employed in the fetch control unit 132 in response to an instruction from the control signal generating unit 115.

The decode sequencer 114 may be initialized when the instruction is stored within the instruction register 113. It should be noted that in case when the instruction being stored in the instruction register 113 corresponds to a TRAP (software interrupt) command, the decode sequencer 114 is not initialized, but requests the exception initiating unit 111 to execute the TRAP exception. Upon receipt of the exception demand by the exception initiating unit 111, the decoding operation by the decode sequencer 114 is blocked and then is brought into the initial state.

The control signal generating unit 115 has such a function to output a control signal to either an internal circuit of the decoder unit 110, or other circuit blocks of the first information processing apparatus. When the transition to the exception is carried out, the control signal generating unit 115 generates the control signal in response to the exception number from the exception initiating unit 111 and the condition number from the exception sequencer 112. On the other hand, when the normal instruction is decoded, this control signal generating unit 115 generates a predetermined control signal in response to the machine-language instruction code from the instruction register 113 and the condition number from the decode sequencer 114. It should be understood that when the transition to the exception is performed, since the normal instruction decoding operation is blocked, generation of the control signal for the transition process to the exception does not compute with generation of the control signal for the normal instruction decoding process. Furthermore, the control signal generating unit 115 produces control signals such as an instruction process code, a register code and an instruction length with respect to the execution sequencer 122, and also produces control signals such as a fetch stop instruction and a fetch start instruction with respect to the fetch control unit 132.

The execution unit 120 has such a function to execute a calculation based upon a process code which is obtained by decoding the machine-language instruction in the decoder unit 110. The execution unit 120 includes a data path 121 and an execution sequencer 115.

The data path 121 of this execution unit 121 is constructed of, although not shown in detail, various registers, calculators, data buses, literal buffers, program counters and program counter incrementor. This data path executes calculations with employment of the calculation registers and calculators controlled by the execution sequencer 122. Under control of the execution sequencer 122, the program counters of the data path 121 are updated.

There are two methods for programing the program counters. In a first method, the program counters are updated based upon the value of the program counter incrementor. In normal, a series of machine-language instructions which have been stored in the continuous memory regions are performed. Since the program counter incrementor outputs a value obtained by adding the present execution instruction length given from the decoder unit 110 to the values of the program counters, namely a value indicative of a storage address of an instruction to be executed in the next process time, the program counters are updated by this value. The value outputted from the program counter incrementor may be used as a return address saved in a stack when performing the call subroutine and the transition process to the exception.

As a second method, the program counters are updated by employing values stored in the lateral buffers. In the jumping instruction or the like, since the displacement contained in the machine-language instruction is stored in the literal buffers by the decoder unit 110, the program counters are updated by utilizing the displacement. For instance, as to the relative address type branch instruction, since the offset value of the jump for the destination address of the present program counter is stored in the literal buffer, the program counters are updated based upon a value obtained by adding the values of the lateral buffers to the value of the program counter. With respect to the absolute address type jumping instruction, since the destination address is stored in the literal buffer, the program counters are updated by this value.

A selection between these program counter updating methods is performed under control of the execution sequencer 122.

The execution sequencer 122 is arranged by a state transition circuit and a control signal producing circuit (not shown in detail). Alternatively, this execution sequencer 122 may be constructed by a microprogram. The execution sequencer 122 initiates the state transition in accordance with the process code from the decoder unit 110, and outputs either a control signal for controlling the data path 121 under a predetermined condition, or a memory read/write demand for the data access controlling unit 131. It should be noted that once the state transition of the execution sequencer 122 is initiated, no influence is given to this execution sequencer 122 even when the exception demand is accepted by the decoder unit 110.

The data access controlling unit 131 employed within the memory control unit 130 performs read/write operations of calculation data to the memories (not shown) under control of the execution sequencer 122.

The fetch control unit 132 is arranged by a fetch counter and a fetch counter incrementor (not shown in detail). The fetch control unit 132 executes the instruction fetch thereby to store the result into the instruction fetch 140, and also updates the fetch counter based on the value of the fetch counter incrementor under such a condition that the content of the instruction queue 140 is empty and the data access control unit 131 does not occupy the memory buses (i.e., the memory data bus 20 and the memory address bus 40).

It should be noted that when the fetch address becomes discontinued due to the jumping instruction, the destination address stored in the lateral buffer is stored into the fetch counter, and then the destination instruction can be fetched. In addition, the fetch control unit 132 acquires the head address of the exception sequence and fetches the exception sequence in response to the decoder unit 110 while performing the transition process to the exception.

Finally, the instruction queue 140 is arranged by a FIFO (First-In First-Out) arrangement, stores a fetched instruction series under control of the fetch control unit 132, and also outputs an instruction to the decoder unit 110 if a demand is issued from the decoder unit 110.

General Instruction Processing Operation

Before describing the transition process to the exception effected by the first information processing apparatus, the general instruction processing operation will now be summarized.

Figure 4:
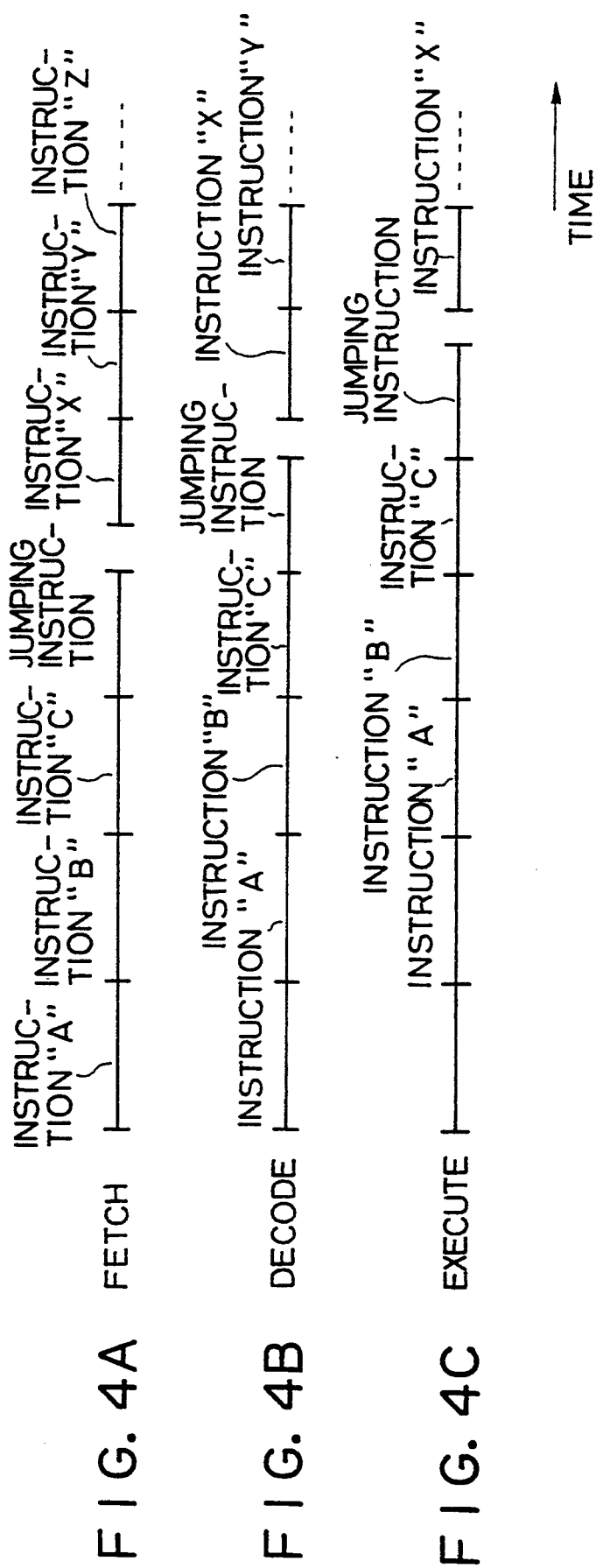
FIGS. 4A, 4B and 4C schematically represent a timing chart of fetch/decode/execute operations of the first information processing apparatus shown in FIG. 3.

FIG. 4 is a timing chart for explaining operations of the respective circuit blocks employed in the first information processing apparatus while performing the normal instruction.

As shown in FIG. 4, the respective circuit blocks are separately operated so that an instruction pipeline system.

First, an instruction "A", for example, is fetched from the memory address indicated by the fetch counter (not shown in detail) of the fetch control unit 132 under control of the fetch control unit 132 employed in the memory control unit 130, and then stored into the instruction queue 140 (see FIG. 4A). Thus, this instruction "A" is acquired from the instruction queue 140 and decoded in the decoder unit 110 (see FIG. 4B). Furthermore, a process code, a register code, a calculation size and an instruction length are produced in the decoder unit 110 so as to execute the instruction in the execution unit 120. In this execution unit 120, a predetermined calculation is performed in accordance with the process code, register code and calculation size derived from the decoder unit 110 (see FIG. 4C). In addition, the program counter is updated by the present execution instruction length derived from the decoder unit 110.

A description will now be made of a process for a jumping instruction.

When a jumping instruction is recognized by the decoder unit 110, second word acquisition is demanded to the instruction queue 140 in order to acquire displacement (destination address). If the destination address from the instruction queue 140 is acquired by the decoder unit 110, this destination address is stored into the literal buffer employed in the data path 121, and also stored into the fetch control unit 132. At this time, the decoder unit 110 outputs a fetch stopping instruction to the fetch control unit 132 in order that the fetch control unit 132 newly fetch other instruction, and simultaneously the instruction queue 140 is cleared. Even if the fetch operation is newly performed by the fetch control unit 132, the fetched data (instruction) is not stored into the instruction queue 140.

Furthermore, a fetch starting instruction is issued from the decoder unit 110 to the fetch control unit 132. As a result, the fetch control unit 132 commences the fetch operation of the destination instruction. Then, the process code of the jumping instruction is transferred from the decoder unit 110 to the execution sequencer 122. Thereafter, since the destination instruction is fetched into the instruction queue 140, a decoding operation for a destination instruction sequence is commenced.

Next, various process operations in the execution unit 120 into which the jumping instruction has been transferred, will now be explained.

In response to an instruction issued by the execution sequencer 122, the destination instruction address which has been stored in the literal buffer (not shown) employed in the data path 121, is stored in the program counter employed therein.

As previously described, since both the instruction decoding operation and the instruction execution are executed in the pipeline form, even normal instruction can be processed at high speed in accordance with the first information processing apparatus. In case that the fetch address of the instruction sequence is brought into a discontinuous state due to the jumping instruction or the like, the destination instruction fetching operation is instructed at a time instant when the jumping instruction is recognized by the decoder unit 110, so that high-speed process operation can be realized. This technique is also applied to the below-mentioned high-speed transition process to the exception.

Exception Handling

Before describing an exception operation executed by the first information processing apparatus shown in FIG. 3, an initial condition of this exception operation will now be explained.

In FIG. 3, the exception initiating unit 111 continues to monitor an occurrence of an exception demand if the condition of the exception sequencer 112 is under the initial state. As a result, the exception demand may be immediately accepted by the exception sequencer 112 irrelevant to any phase at which an instruction is executed when the demand is issued unless other transition process to the exception is performed. In this case, although the instruction decoding operation by the decoder unit 110 is immediately suppressed or interrupted, the instruction which is under execution by the execution unit 120 may be accomplished. Accordingly, with respect to the execution sequence, when the exception is demanded, the execution is transferred to the exception routine after execution of the present instruction has been accomplished.

Figure 5:
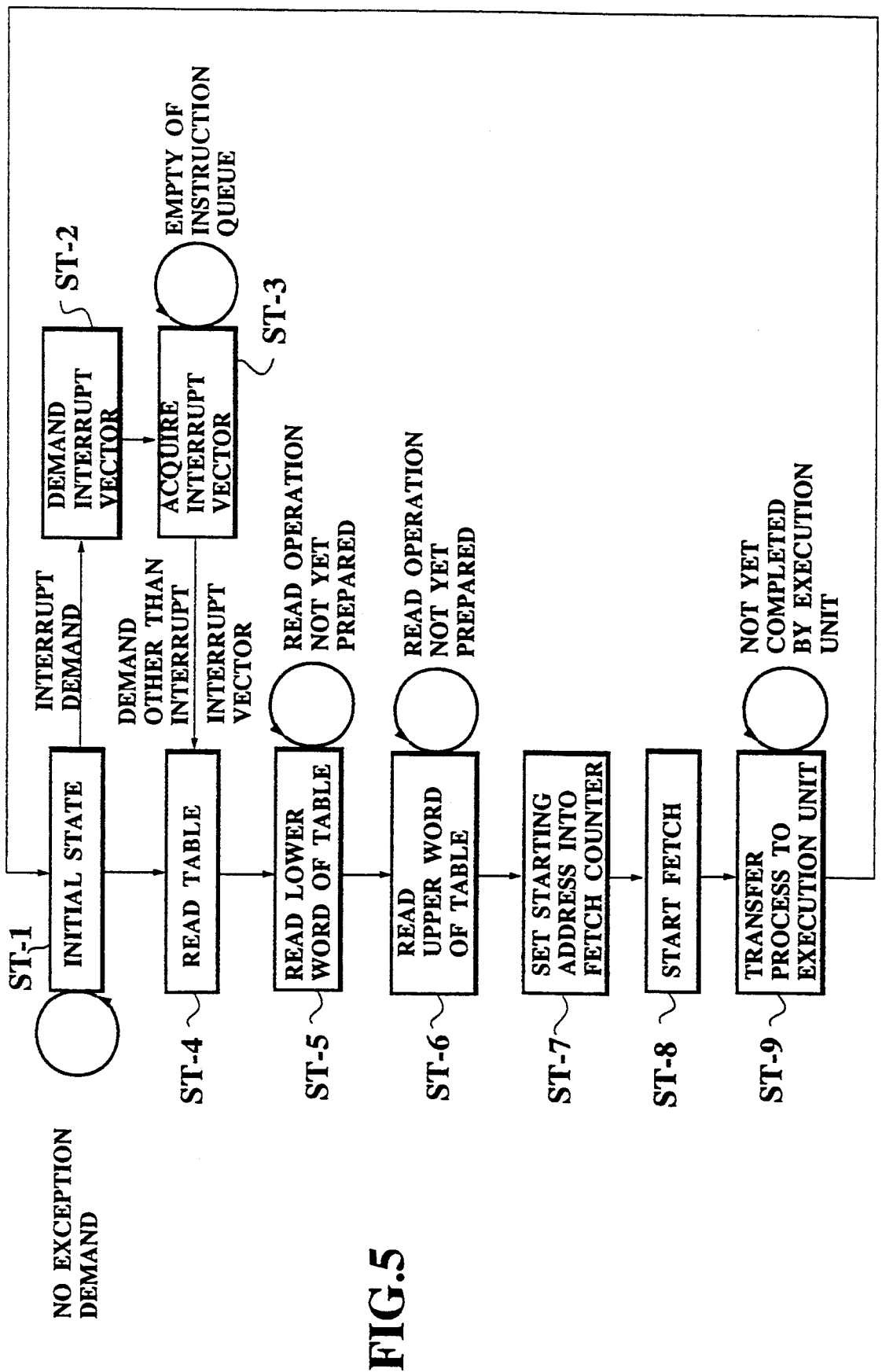
FIG. 5 is a flow chart for explaining the transition process operation to the exception performed by the first processor shown in FIG. 3.

The state transition of the exception sequencer 112 is represented in FIG. 5. The transition process operation to the exception will now be explained with reference to FIG. 5.

Upon issuance of an exception demand, the exception initializing unit 111 holds an exception number indicative of a type of this exception into the internal register, and outputs this process number. Also, this exception initializing unit 111 instructs the exception sequencer 112 which should be moved to execution of the exception, namely exception state transition. The exception state transition is brought into an initial condition (step ST-1 of FIG. 5) when no exception demand is issued, i.e., a normal instruction is under execution. To the contrary, when an issuance of the exception is accepted, the exception state transition is transferred to various conditions which will be explained after a step ST-2.

Furthermore, an exception initiating signal is outputted from the exception initiating unit 111 to other circuit blocks (for instance, the decoder unit 110, instruction queue 140, fetch control unit 132). As a consequence, the present normal instruction executed by the decoder unit 110 is immediately interrupted, and then the normal instruction decoding state transition is returned to the initial condition. All of the instructions stored in the instruction queue 140 are cleared. The instruction which is under fetch condition by the fetch control unit 132, is not stored into the instruction queue 140 even after the fetch operation has been completed. It should be noted that no execution unit 120 is influenced and the instruction under execution will be continuously executed until the execution of this instruction is accomplished in the normal condition.

When the exception demand accepted by the exception sequencer 112 corresponds to an interrupt demand issued outside the first information processing apparatus, a demand to acquire an interrupt vector is issued from the decoder unit 110 to the memory control unit 130 at a step ST-2. It should be noted that since a preselected exception vector is generated from the instruction register 113 by the decoder unit 110 in case of any exception other than the interrupt process (for instance, a TRAP instruction produced within the first information processing apparatus), it is not required to acquire the exception vector outside this first information processing apparatus, so that the control process for the exception operation in this case is not brought into the above-described process at the step ST-2.

The interrupt vector is acquired via the instruction queue 140 from the memory control unit 130, which is similar to the fetch operation for the normal instruction at a step ST-3. The first information processing apparatus waits for a further process under this state until the interrupt vector is acquired into the instruction queue 140.

Next, a table read demand is issued at a step ST-4. That is, such a demand is issued to the fetch control unit 132 that a 32-bit starting address of the exception routine is acquired from a memory address which is defined by multiplying by 4, either the acquired interrupt vector, or the produced interrupt vector.

Subsequently, a lower word of this table is read at a step ST-5. More specifically, a 16-bit lower word of the starting address of the exception routine is accepted via the instruction queue 140, and transferred to a lower word of the literal buffer (not shown in detail) employed in the data path 121. Until data is stored in the instruction queue 140, this control process is brought into the waiting state.

Furthermore, an upper word of this table is read at a step ST-6. More specifically, a 16-bit upper word of the starting address of this exception routine is accepted via the instruction queue 140, and then transferred to an upper word of the literal buffer employed in the data path 121. Until the data is stored into the instruction queue 140, the first information processing apparatus is brought into the waiting state under this condition.

The 32-bit starting address of the exception routine which has been stored into the above-described literal buffer is transferred from this literal buffer to the fetch control unit 132, so that this starting address is stored into the fetch counter (not shown in detail) of the fetch control unit 132 at a step 7.

Thereafter, an instruction to start a fetch operation is made to the fetch control unit 132. This instruction issuing mechanism is the same as in the instruction to fetch a destination demand for the jumping instruction.

As a result, the fetch operation of the exception routine is commenced at a step ST-8.

Up to this step ST-8, the transition process to the exception by the exception sequencer 112 has been completed.

At a final step ST-9, the exception code is transferred from the exception sequencer 112 to the exception unit 120. As a consequence, the state transition of the exception sequencer 112 is returned to the initial condition at the step ST-1, and therefore the first information processing apparatus is brought into the waiting state for a next occurrence of an exception demand. If the previous normal instruction has not yet been executed in the execution unit 120, the first information processing apparatus is under waiting state until this execution of the normal instruction is accomplished. Once an instruction series of the exception routine which is fetched thereafter, is stored in the instruction queue 140, the normal instruction is decoded by the decoder unit 110.

In the execution unit 120, once the previous instruction, e.g., the instruction "C" shown in FIG. 4A has been executed, a predetermined process such as a saving operation of a recovery address (the value of the program counter incrementor) from the exception is carried out in accordance with an exception code transferred from the decoder unit 110. The exception sequence performed in the execution unit 120 will now be described.

First, in order to update the stack pointer (not shown in detail) employed in the data path 121, the value of the stack pointer is subtracted by 4 with employment of the calculator of the data path 121. In connection with this subtraction process, a memory write demand is issued to the data access control unit 131. When an acknowledge signal is returned from the data access control unit 131, a newly calculated value of the stack pointer is transferred as an address to the data access control unit 131. At the same time, this newly calculated value of the stack pointer is returned to the stack pointer so as to update this stack pointer.

Thereafter, as the data saved to the stack, either the recovery address (i.e., the value of the program counter incrementor), or various register values are transferred to the data access control unit 131. In the data access control unit 131, the transferred address, namely the data to be saved to the stack address is stored. A head address of the exception sequencer which has been stored in the literal buffer (not shown in detail) is stored into the program counter as a new value of the program counter.

Timings of Various Circuit Blocks During Exception Operation

Figure 6:
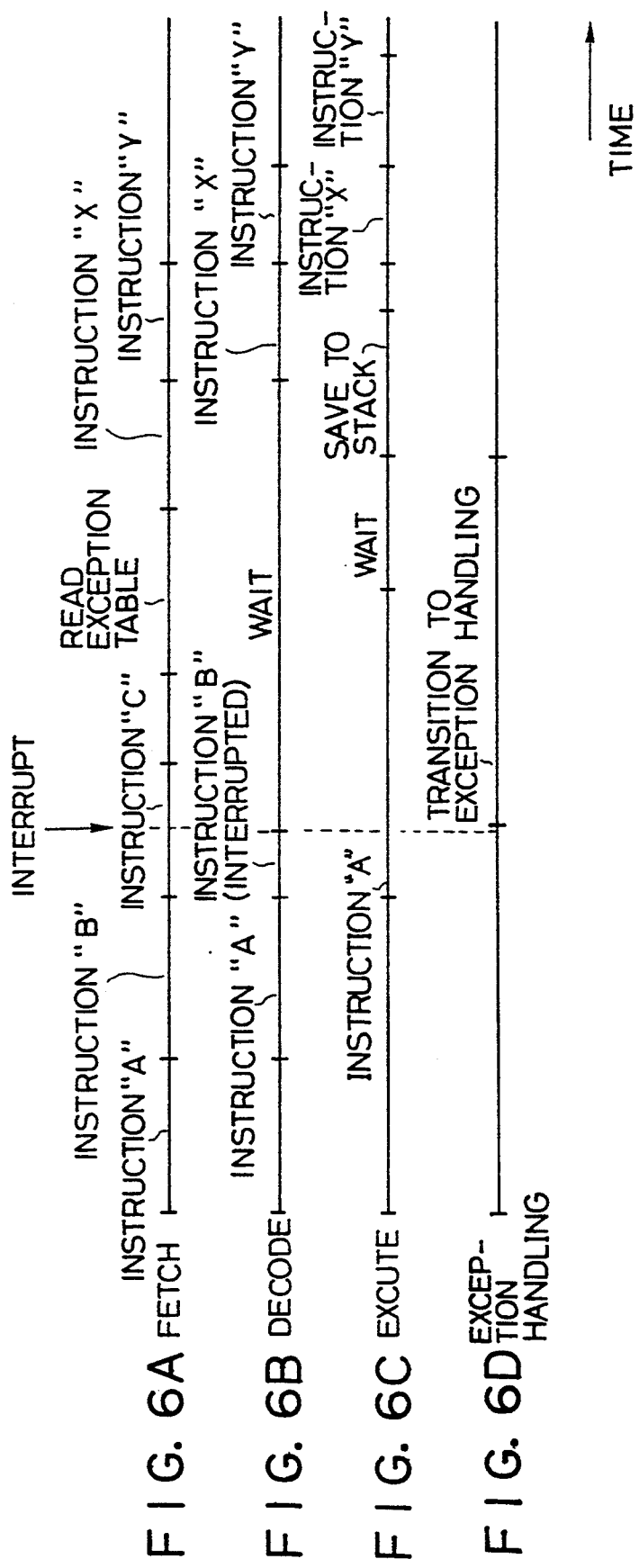
FIGS. 6A, 6B, 6C and 6D are timing charts of various circuit blocks of the first processor when the interrupt demand is issued.

In FIG. 6, there is shown a timing chart of operations of the various circuit blocks employed in the first information processing apparatus shown in FIG. 3, in case when an interrupt demand (namely, an exception demand) is issued.

Figure 1:
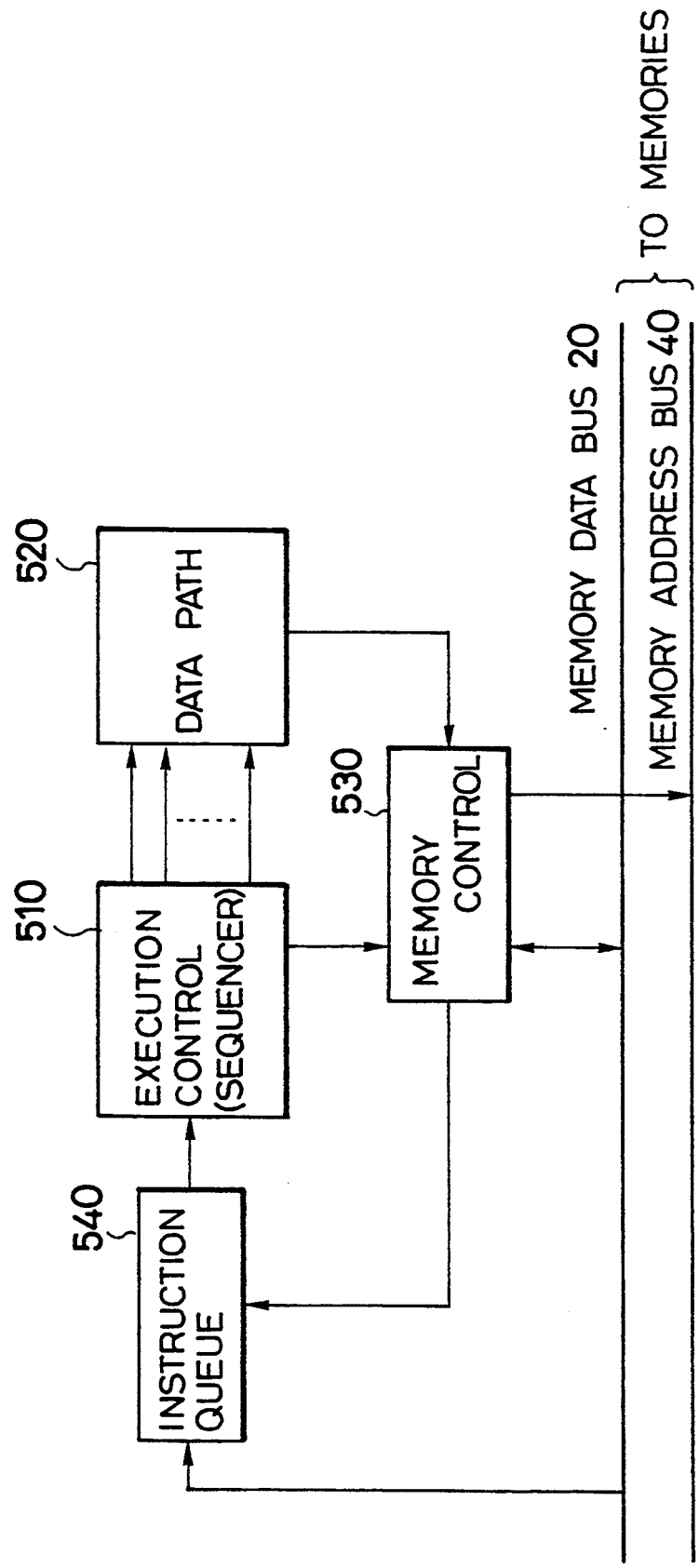
FIG. 1 is a schematic block diagram for showing an arrangement of one conventional information processing apparatus.
Figure 2:
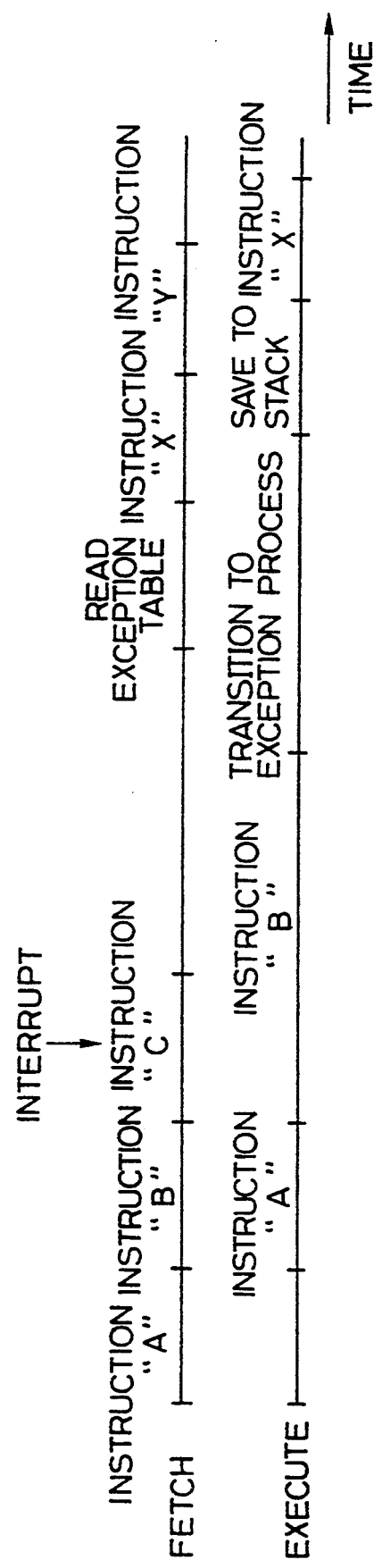
FIG. 2 is a timing chart for pictorially explaining the normal instruction execution and the exception execution.

As shown in FIGS. 6A to 6C, the interrupt demand is issued while the instruction "C" is fetched (see FIG. 6A), the instruction "B" is decoded (see FIG. 6B) and the instruction "A" is executed (see FIG. 6C). Thus, the decoding operation of the instruction "B" is interrupted, whereas the execution of the instruction "A" is continued until the execution of this instruction has been completed. At the same time when the interrupt demand is issued, the transition process operation to the exception by the above-described exception sequencer 112 is carried out. As apparent from this drawing (FIGS. 6A to 6D), the time period from the occurrence of the interruption demand to the commencement of the transition process for the exception (i.e., interrupt demand), according to the first preferred embodiment, may be considerably shortened, as compared with the corresponding time period of the conventional information processing apparatus (see FIG. 2).

As previously described in detail, since the exception initiating unit 111 and the exception sequencer 112 are employed to process the exception demands in the first information processing apparatus, which are operable independently from the decoder unit 110 and the execution sequencer 122 employed for processing the normal instructions, such exception demands can be immediately accepted by these exception circuit blocks 111 and 112 irrelevant to the execution of the present instruction. Moreover, in parallel with the execution of the present instruction, various transition processes for the exception can be performed, for instance, acquisition of the interrupt vector, acquisition of the head address of the exception instruction routine, or commencement to fetch the exception instruction routine.

As a result of these merits of the first preferred embodiment, such a high-speed response to an interrupt demand response can be achieved. In particular, if an interrupt demand is issued while executing an instruction for requiring a lengthy execution time period such as a multiplying/dividing calculation instruction, the transition process for the exception may be almost accomplished within the execution of such a lengthy instruction, and therefore the execution of the exception routine may be immediately commenced once this lengthy instruction's execution is ended.

Furthermore, no adverse influence is given to the operations of the execution unit 120, while executing the transition process operation to the exception in accordance with the first information processing apparatus as represented in FIG. 3. In other words, since the transition process operation to the exception is carried out after the execution of the present instruction has been accomplished, no adverse influence caused by executing the transition to process operation the exception is produced in the first information processing apparatus. As a consequence, the first information processing apparatus can provide such a high-speed and highly reliable method capable of executing the transition process operation to the exception.

General Description of Second Information Processing Apparatus

Figure 7:
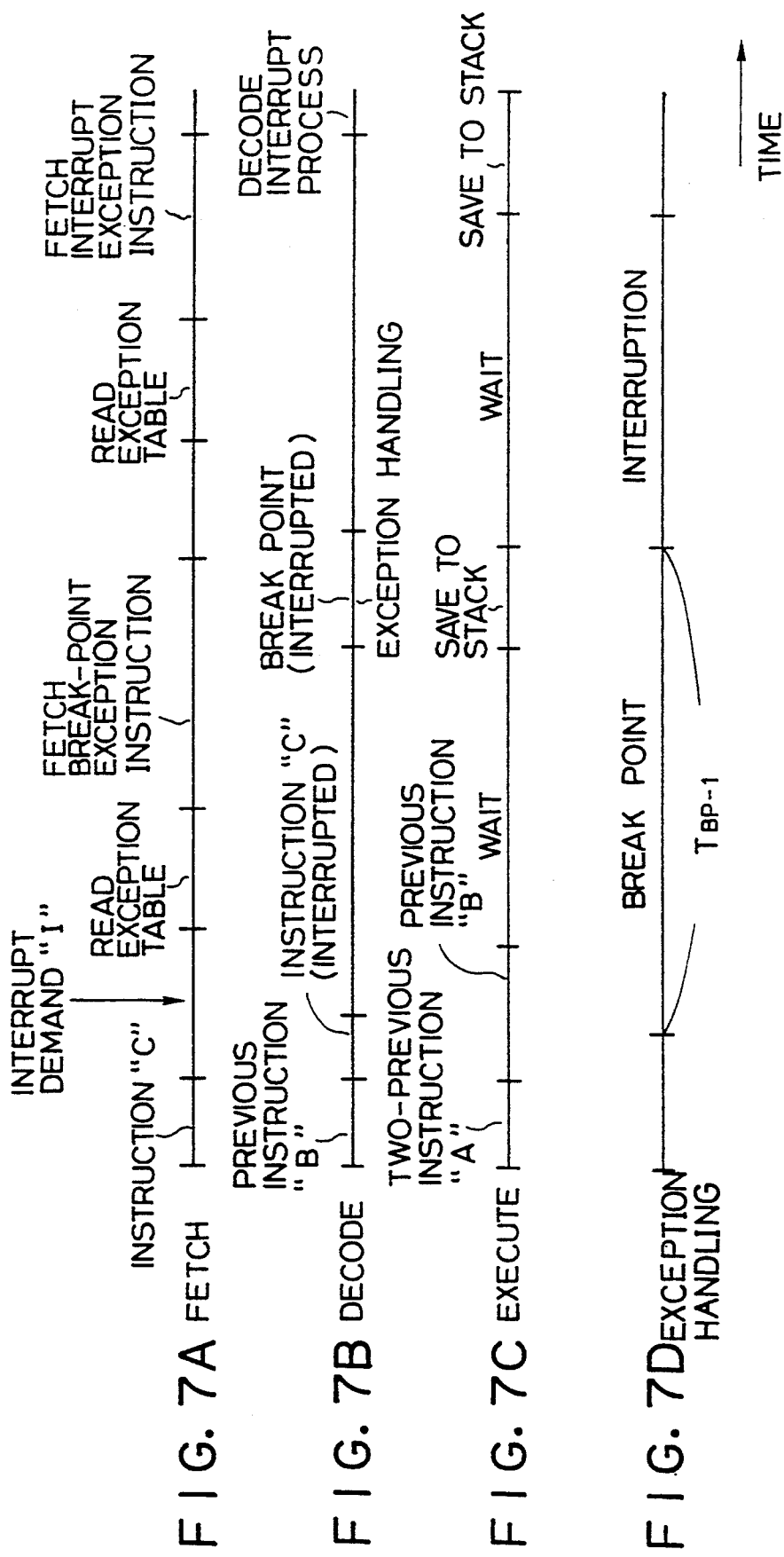
FIGS. 7A, 7B, 7C, and 7D are timing charts of various circuit blocks of the first processor when the break-point exception instruction is executed.

As previously stated, even when another interrupt demand (exception demand) is newly issued while performing a transition process for one exception in the above-described first information processing apparatus, such a new interrupt demand is not acceptable until the execution of the present transition process has been accomplished, which will now be summarized in more detail with reference to a timing chart shown in FIG. 7.

It is now assumed that a break point has been set into an instruction "C", by which the process operation of the first information processing apparatus should be interrupted at a certain address. For instance, a break-point exception is demanded from the inside of this first processor by decoding the instruction "C". Then, the transition process to the break-point exception is commenced in conjunction with the execution of the previous instruction "B". However, according to the above-described first processor, even when an interruption demand (namely, an exception demand) "I" is newly issued while performing the execution of the break-point exception, this new interrupt demand is not acceptable until the transition process operation to the break-point exception has been completely accomplished.

As a consequence, this implies that even when this new interrupt demand has a higher priority than that of the break-point exception, the interrupt demand having such a higher priority is not acceptable by the first processor until the transition process operation to the exception having a lower priority (namely, the break-point exception) has been completed. Therefore, the response characteristic to the interrupt demand having the higher priority is deteriorated in the first processor.

To furthermore improve the high-speed response characteristic of the first information processing apparatus according to the present invention, the following functions are additionally provided in an information processing apparatus of a second preferred embodiment of the present invention. That is, such functions are additionally employed with the exception sequencer 112 shown in FIG. 3 that a check is made whether or not an exception having a high priority is initiated at a time instant when a head address of the exception sequence has been acquired; when the exception having the high priority is demanded, the acquired head address of the exception sequence is discarded and the transition process operation to the exception having such a high priority is immediately commenced.

Major Arrangement of Second Information processing Apparatus

Figure 8:
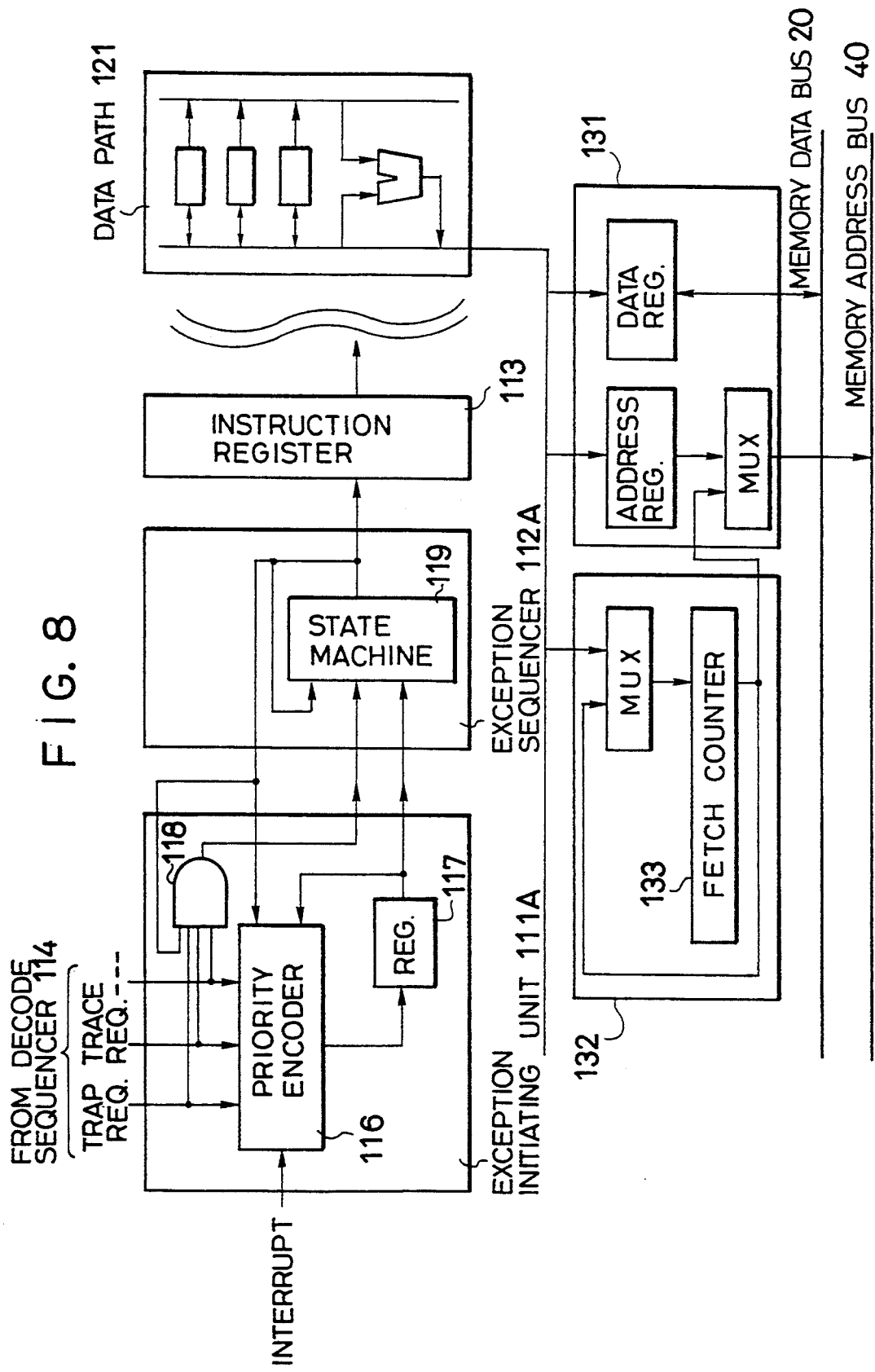
FIG. 8 schematically illustrate a major circuit arrangement of a second processor according to a second preferred embodiment of the present invention.

FIG. 8 schematically illustrates a major circuit arrangement of an information processing apparatus according to a second preferred embodiment of the present invention.

Since the most circuit arrangement of the second information processing apparatus is similar to that of the first information processing apparatus shown in FIG. 3, only a major (featured) circuit arrangement thereof is represented in FIG. 8.

In other words, both an exception initiating unit 111A and an exception sequencer 112A are newly employed as the featured circuit arrangement of the second processor as shown in FIG. 8. Previously speaking, the exception initiating unit 111A further includes a priority encoder 116, a register 117 and an AND gate 118. The priority encoder 116 manages a plurality of exception demands, and also judges whether or not the process operation of the second processor should be rescheduled. The output from the priority decoder 116 is once stored in the register 117 and then supplied to a state machine 119 employed in the exception sequencer 112A. On the other hand, various requests such as the TRAP request and TRACE request derived from the decode sequencer 114 (not shown in FIG. 8, but shown in FIG. 3) are supplied to the priority encoder 116 together with the interrupt demand, and also AND-gated by the AND gate 118. The AND-gated output from this AND gate 118 is similarly supplied to the state machine 119 (will be described in more detail).

Functions of Exception Sequences 112A

Functions of the exception sequencer 112A will now be described in case that an interrupt demand is newly issued during the transition process operation to the exception.

Assuming now that priorities of exception demands are classified into two priority tables:

Low priorities: Break-point exception demand; Trap exception demand; and Undefined instruction.

High priorities: Interruption demand; Top-priority interruption demand, and Zero-dividing calculation demand.

It should be noted in the second processor that no more than two exception demands belonging to the same priority table, e.g., the high priority table are issued at the same time, and the trace exception demand in which the process operation of the second processor is interrupted at each instruction, is excluded from the above-described priority comparison table. In other words, the priorities of the respective exception demands belonging to the same priority table are equal to each other.

Figure 9:
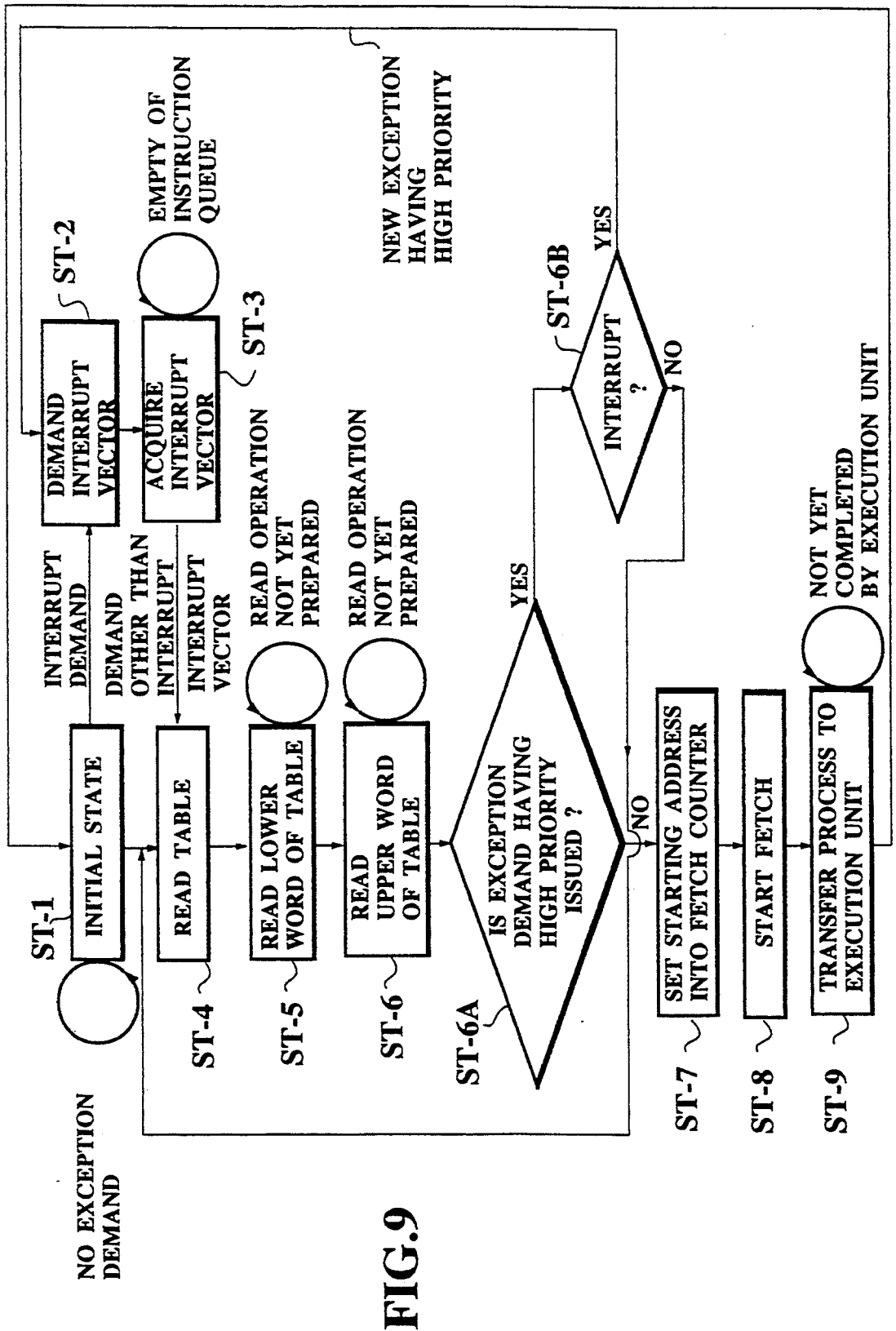
FIG. 9 is a flow chart for explaining the priority comparison operation by the second processor shown in FIG. 8.

A sequential operation by both the exception initiating unit 111A and the exception sequencer 112A employed in the second processor according to the second preferred embodiment will now be described with reference to FIGS. 8 and 9. FIG. 9 shows a flow chart for explaining this sequential operation of the exception sequencer 112A. As apparent from FIG. 9, the major sequential operation of this flow chart is the same as that of the first processor shown in FIG. 5. Roughly speaking, two judging steps ST-6A and 6T-6B are newly interposed between the step ST-6 and the step ST-7 of the first flow chart shown in FIG. 5.

Referring now to FIG. 9, a comparison of priorities by the exception sequencer 112A employed in the second information processing apparatus shown in FIG. 8 will be described.

Up to the steps ST-6, since the process operations by this second processor are identical to those of the first processor (see FIG. 5), no further explanation is made in the second preferred embodiment. At the subsequent step ST-6A, a check is made whether or not an exception demand is newly issued at a time instant when data is stored in the instruction queue 140. In accordance with the second preferred embodiment, when the new exception demand is issued, a further process operation by the second processor differs from each other, depending upon a degree of priorities between the present exception under exception and the newly issued exception.

If the priority degree of the present exception under execution is higher than, or equal to that of the newly issued exception (namely, "NO" at the step ST-6A), then the process operation is advanced to the step ST-7 at which the present exception is continuously executed. Also, even if the trace exception process demand is newly issued, the present exception operation is continued. This priority degree comparison is carried out by the priority encoder 116 of the exception initiating unit 111A.

To the contrary, if the priority degree of the newly demanded exception is higher than that of the present exception under execution (namely, "YES" at the step ST-6A), the previously acquired starting address of the exception routine is discarded, and also this newly issued exception having the higher priority than the priority of the present exception is accepted by the state machine 119 of the exception sequencer 112A, so that an exception number of the new exception is stored into the register 117 of the exception initiating unit 111A. At a next step ST-6B, another check is made whether or not the newly accepted exception demand corresponds to the interrupt demand. If "YES", then the process is advanced to the previous step ST-2. Conversely, if "NO", then the process is returned to the step ST-4.

Returning back to the step ST-7, the starting address of the present exception routine is similarly stored into the fetch counter 133 employed in the fetch control unit 132. Since the process operations after this step ST-7 are similar to those of the first processor (see FIG. 5), not further explanation thereof is made.

After the transition process operation had been completed, a value which is obtained by incrementing the value of the program counter of the data path 121, is saved as the recovery address transferred to the data access control unit 131 by the execution unit 120 with respect to the break-point exception demand, TRAP exception demand and undefined instruction.

On the other hand, if the newly issued exception demand corresponds to one of the zero-dividing calculation demand, interruption demand, and top-priority interruption demand, the value of the program counter which has not yet been incremented is saved. As a result, after recovering from the exception, since an instruction is again fetched for a further process operation that the decoding operation of this instruction was suppressed or blocked due to the issuance of the above-described exception.

Operation Timings of Second Processor When Interrupt Demand is Issued During Transition to Break-Point Exception FIG. 10 is a timing chart for explaining operations of the respective circuit blocks employed in the second processor shown in FIG. 8 when an interrupt demand is issued during a transition process operation to a break-point exception.

It is assumed that a break-point has been set into an instruction "C", which is similar to the first processor (see FIG. 7). Then, a break-point exception demand is issued by decoding the instruction "C" (see FIG. 10B), and thus the transition process operation to the break-point exception is commenced. Thereafter, an interrupt demand "I" is newly issued as shown in FIG. 10A. After an externally prepared exception table has been read out, a confirmation is made that the interrupt demand is newly issued, while performing the transition process operation to the break-point exception.

Since the priority of the newly issued interrupt demand is higher than that of the break-point exception demand, as previously explained in the second processor, the transition process operation to the break-point exception is interrupted or broken at this time instant, and another transition process operation to the new interrupt exception having such a higher priority is immediately commenced. Accordingly, the second processor has such a particular advantage that a time period "$T_{BP-2}$" (see FIG. 10D) until the new exception operation is commenced can be shortened, as compared with a time period "$T_{BP-1}$" (see FIG. 7D) of the first processor.

As previously described in detail, in accordance with the second processor, since the priority judgement function is merely added to the exception initiating unit 111A and the exception sequencer 112A, even when one exception demand having a higher priority than that of the present exception demand is issued while performing the transition process operation to the present exception, such a new exception demand with the higher priority can be accepted. As a consequence, for instance, even if the interrupt demand is issued while executing the transition process operation to the break-point exception, it is not necessary to wait for ending of this transition process operation to the break-point exception with the low priority. Therefore, this interrupt demand having the higher priority than that of the break-point exception demand under exception can be accepted, and the response time to the interrupt demand can be shortened. Moreover, one exception having such a low priority which has been discarded because the other exception having a high priority was accepted during the execution of the first-mentioned exception, can be again decoded after recovering from the execution of the exception having such a high priority, so that this exception demand having the low priority is not lost.

Modifications

The present invention is not limited to the above-described first and second preferred embodiments, but may be changed, substituted or modified without departing from the technical spirit and scope of the present invention.

For instance, although the comparison between the priorities of the exception demands has been performed at the timing when the head address of the exception routine was acquired in the second processor, other timings may be alternatively employed as this comparison timing. Furthermore, the number of such a comparing operation may be selected to be any integer other than 1. For instance, a first comparison is made between the steps ST-4 and ST-5 shown in FIG. 5, and a second comparison is made between the steps ST-7 and ST-8.

Also, the exception sequencer 112 or 112A was separately constructed with the decode sequencer 114 for decoding the normal instructions in the first and second processors. Alternatively, these sequencers may be combined with each other, resulting in a similar advantage. In this case, when the exception demand is accepted while decoding the normal instruction, the process operation of the processor is moved to the initial state of the exception sequence operation even under any states, and therefore the transition process operation to the exception can be subsequently carried out. Otherwise, upon issuance of the exception demand, the decoding state transition may be immediately returned to the initial state from which the transition process operation to the exception may be entered.

In addition, although the program counter was employed in the data path 121, it may be employed in the fetch control unit 132. If a processor of the present invention is realized with a single sequencer capable of executing both the decoding operation and the instruction operation, an advantage similar to those of the first and second processors may be achieved under such a condition that the exception sequencer 112 is independently operable with the normal instruction process sequencer.

As previously stated, in accordance with the processors of the present invention, a very fast interrupt demand response can be achieved, and also since no adverse influence is given to the instruction operation under execution, the transition process operation to the exception can be realized at high reliability.

What is claimed is:

1. An information processing apparatus comprising:
   normal-instruction executing means for controlling execution of a normal instruction used for the information processing apparatus;
   exception executing means independently operable from the normal instruction executing means, for controlling a transition process operation to an exception used in the information processing apparatus; and,
   exception initiating means for initiating the transition process operation of the exception means by immediately recognizing an issuance of an exception demand, wherein upon issuance of the exception demand, the transition process operation to the exception is independently executable by the exception executing means, while the normal instruction is executed by the normal-instruction execution means.

2. An information processing apparatus as claimed in claim 1, wherein said normal-instruction executing means includes:
   an instruction register for storing therein the normal instruction acquired from an instruction queue; and,
   a decode sequencer for decoding the normal instruction read from the instruction register and for interrupting the decoding operation of the normal instruction thereof while the transition process operation to the exception is performed by the exception executing means.

3. An information processing apparatus as claimed in claim 1, wherein said exception executing means controls at least one of acquisition of an interrupt vector, acquisition of a head address of an exception routine and commencement of fetching a command series of the exception routine contained in said transition process operation to the exception.

4. An information processing apparatus as claimed in claim 1, wherein said exception initiating means includes:
   means for producing an exception number indicative of a type of the exception upon issuance of the exception demand;
   means for storing therein said exception number; and
   means for instructing said exception means to perform the transition process operation to the exception.

5. An information processing apparatus comprising:
   normal-instruction executing means for controlling execution of a normal instruction used for the information processing apparatus;
   exception executing means independently operable from the normal-instruction executing means, for executing a first transition process operation to a first exception by comparing priority degrees between the first transition process operation and a second transition process operation to a second exception at a predetermined time instant when the first transition process operation is being executed in such a manner that if the priority degree of the second transition process operation is higher than that of the first transition process operation, the first transition process operation under execution is interrupted and the second transition process operation is executed; and,
   exception initiating means for initiating the first transition process operation by the exception means by immediately recognizing an issuance of an exception demand, whereby upon issuance of the exception demand, both the first and second transition process operations are independently executed by the exception executing means, while the normal instruction is executed by the normal-instruction execution means.

6. An information processing apparatus as claimed in claim 5, wherein said normal-instruction executing means includes:
an instruction register for storing therein the normal instruction acquired from an instruction queue; and,
a decode sequencer for decoding the normal instruction read from the instruction register and for interrupting the decoding operation of the normal instruction thereof while the transition process operation to the exception is performed by the exception executing means.

7. An information processing apparatus as claimed in claim 5, wherein said exception initiating means includes:
a priority encoder for comparing the priority degrees between the first transition process operation and the second transition process operation thereby to determine that one transition process operation having the high priority is being executed by the exception executing means.

8. An information processing apparatus as claimed in claim 5, wherein said exception executing means includes:
a state machine for discarding a first starting address of a first exception routine for said first transition process operation and for accepting a second starting address of a second exception routine for said second transition process operation when the priority degree of the second transition process operation is higher than that of the first transition process.

9. A microprocessor comprising:
an instruction execution unit for executing a normal instruction and an exception instruction used in the microprocessor;
a storage unit for storing at least said normal instruction and said exception instruction;
an instruction decoding unit having at least a normal-instruction decoding sequencer and an exception-instruction decoding sequencer, for decoding said normal instruction by said normal-instruction decoding sequencer and for decoding said exception instruction by said exception-instruction decoding sequencer independently of the decoding operation by said normal-instruction decoding sequencer wherein said instruction executing unit executes a transition process to said exception instruction while executing said normal instruction immediately upon receipt of an exception demand.

10. A microprocessor as claimed in claim 9, further comprising:
an exception initiating unit for accepting a plurality of exception instructions to select one exception instruction having a top priority, and for initiating said exception-instruction decoding sequencer based on the selected exception instruction.

11. A microprocessor as claimed in claim 10, wherein said exception initiating unit selects one of a general interrupt demand, a non-maskable interrupt demand, a software interrupt demand, a trace exception demand, a zero-dividing calculation demand, and a break-point exception demand as said one exception instruction having the top priority.

12. A microprocessor as claimed in claim 9, wherein said instruction decoding unit further includes;
priority comparing means for comparing priority degree between a first exception instruction and a second exception instruction at a predetermined time period during execution of a first transition process operation to said first exception instruction, and for instructing said instruction executing unit in such a manner that if the priority degree of the second exception instruction is higher than that of the first exception instruction, the first transition process operation is interrupted and also a second transition process operation to said second exception instruction is now executed.

* * * * *